United States Patent
Gehringer et al.

(12) 
(10) Patent No.: US 9,062,158 B2
(45) Date of Patent: Jun. 23, 2015

(54) POLYESTER POLYOLS BASED ON AROMATIC DICARBOXYLIC ACIDS

(75) Inventors: Lionel Gehringer, Schaffhouse-pres-Seltz (FR); Gunnar Kampf, Stemwede-Haldem (DE); Marco Balbo Block, Osnabrueck (DE)

(73) Assignee: BASF SE, Ludwigshafen (DE)

( * ) Notice: Subject to any disclaimer, the term of this patent is extended or adjusted under 35 U.S.C. 154(b) by 51 days.

(21) Appl. No.: 13/307,593

(22) Filed: Nov. 30, 2011

(65) Prior Publication Data

US 2012/0142799 A1 Jun. 7, 2012

Related U.S. Application Data

(60) Provisional application No. 61/418,898, filed on Dec. 2, 2010.

(51) Int. Cl.
| | | |
|---|---|---|
| *C08G 18/00* | (2006.01) | |
| *C08G 63/668* | (2006.01) | |
| *C08G 18/42* | (2006.01) | |
| *C08G 18/40* | (2006.01) | |
| *C08G 18/48* | (2006.01) | |
| *C08G 101/00* | (2006.01) | |

(52) U.S. Cl.
CPC .......... *C08G 63/668* (2013.01); *C08G 18/4211* (2013.01); *C08G 18/4219* (2013.01); *C08G 18/4018* (2013.01); *C08G 18/4288* (2013.01); *C08G 18/4816* (2013.01); *C08G 2101/0025* (2013.01); *C08G 2101/0083* (2013.01)

(58) Field of Classification Search
CPC .......... C08G 18/4211; C08G 18/4219; C08G 2101/0025
USPC .......... 560/76, 84, 90, 91; 521/155, 157, 172, 521/173
See application file for complete search history.

(56) References Cited

U.S. PATENT DOCUMENTS

| | | | |
|---|---|---|---|
| 3,267,050 A | 8/1966 | Kuryla et al. | |
| 3,304,273 A | 2/1967 | Stamberger | |
| 3,383,351 A | 5/1968 | Stamberger | |
| 3,523,093 A | 8/1970 | Stamberger | |
| 4,304,708 A | 12/1981 | Marx et al. | |
| 4,374,209 A | 2/1983 | Rowlands | |
| 5,051,528 A | 9/1991 | Naujokas et al. | |
| 5,877,255 A * | 3/1999 | Gerber et al. ................. | 524/590 |
| 6,664,363 B1 * | 12/2003 | Faunce ........................ | 528/295.5 |
| 2008/0114086 A1 * | 5/2008 | Lorenz et al. ................... | 521/88 |

FOREIGN PATENT DOCUMENTS

| | | |
|---|---|---|
| DE | 1 003 714 | 3/1957 |
| DE | 11 11 394 | 7/1961 |
| DE | 1 152 536 | 8/1963 |
| DE | 1 152 537 | 8/1963 |
| DE | 1 215 373 | 4/1966 |
| DE | 1 222 669 | 8/1966 |
| DE | 32 31 497 A1 | 3/1984 |
| EP | 0 011 752 A1 | 6/1980 |
| GB | 987618 | 3/1965 |
| GB | 1040452 | 8/1966 |
| WO | WO 2010/043624 A2 | 4/2010 |
| WO | WO 2010/115532 A1 | 10/2010 |

OTHER PUBLICATIONS

U.S. Appl. No. 13/848,427, filed Mar. 21, 2013, Kampf.
U.S. Appl. No. 13/731,317, filed Dec. 31, 2012, Kampf.
U.S. Appl. No. 13/740,732, filed Jan. 14, 2013, Kampf.
U.S. Appl. No. 14/034,745, filed Sep. 24, 2013, Kampf, et al.

* cited by examiner

*Primary Examiner* — Michael L Leonard
(74) *Attorney, Agent, or Firm* — Oblon, McClelland, Maier & Neustadt, L.L.P.

(57) ABSTRACT

The present invention relates to polyester polyols based on aromatic dicarboxylic acids and their use for producing rigid polyurethane foams.

19 Claims, No Drawings

POLYESTER POLYOLS BASED ON AROMATIC DICARBOXYLIC ACIDS

The present invention relates to polyester polyols based on aromatic dicarboxylic acids and their use for producing rigid polyurethane foams.

The production of rigid polyurethane foams by reacting organic or modified organic diisocyanates or polyisocyanates with relatively high molecular weight compounds having at least two reactive hydrogen atoms, in particular with polyether polyols from alkylene oxide polymerization or polyester polyols from the polycondensation of alcohols with dicarboxylic acids, in the presence of polyurethane catalysts, chain extenders and/or crosslinkers, blowing agents and further auxiliaries and additives is known and is described in numerous patent and literature publications.

Mention may be made by way of example of the Kunststoffhandbuch, Volume VII, Polyurethane, Carl-Hanser-Verlag, Munich, 1st Edition 1966, edited by Dr. R. Vieweg and Dr. A. Höchtlen, and 2nd Edition 1983 and 3rd Edition 1993, edited by Dr. G. Oertel. Appropriate selection of the formative components and their ratios enables polyurethane foams having very good mechanical properties to be produced.

In the context of the present disclosure, the terms "polyester polyol", "polyesterol", "polyester alcohol" and the abbreviation "PESOL" are used synonymously.

When polyester polyols are used, it is usual to employ polycondensates of aromatic and/or aliphatic dicarboxylic acids and alkanediols and/or alkanetriols or ether diols. However, it is also possible to process polyester scrap, in particular polyethylene terephthalate (PET) or polybutylene terephthalate (PBT) scrap. A whole series of processes are known and have been described for this purpose. Some processes are based on the conversion of the polyester into a diester of terephthalic acid, e.g. dimethyl terephthalate. DE-A 1003714 and U.S. Pat. No. 5,051,528 describe such transesterifications using methanol and transesterification catalysts.

It is also known that esters based on terephthalic acid are superior in terms of the burning behavior to esters based on phthalic acid. This is indicated, for example, in WO 2010/043624.

WO 2010/115532 A1, too, describes the preparation of polyester polyols from terephthalic acid and oligoalkylene oxides, by which means products having improved flame resistance are said to be obtained. No fatty acids or fatty acid derivatives are used in this document; low-functionality alcohols are used as starters.

When the polyester polyols based on aromatic carboxylic acids or derivatives thereof (e.g. terephthalic acid or phthalic anhydride) are used to produce rigid polyurethane (PU) foams, the high viscosity of the polyester polyols often has a noticeably adverse effect since it makes metering and mixing significantly more difficult.

In addition, problems with unsatisfactory dimensional stability, i.e. the foam product distorts significantly after removal from the mold or after the pressure section when processed by the double belt process, can occur in certain conventional systems for producing rigid PU foams, for example when using glycerol as relatively high-functionality alcohol component.

The problem of the behavior of rigid PU foams in case of fire has also not yet been solved satisfactorily for all systems. For example, a toxic compound can be formed in the case of fire when using trimethylolpropane (TMP) as relatively high-functionality alcohol component.

A general problem in the production of rigid foams is the formation of surface defects, preferably at the interface with metallic covering layers. These foam surface defects cause formation of an uneven metal surface and thus often lead to visual unacceptability of the product produced. An improvement in the foam surface reduces the frequency of the occurrence of such surface defects and thus leads to a visual improvement in the surface of sandwich elements.

It was therefore an object of the present invention to avoid or at least improve, if possible, all the abovementioned problems. In detail, this means that it was an object of the present invention to provide polyester polyols based on aromatic dicarboxylic acids, in particular for use in a process for producing rigid PU foams, which should have a low viscosity and be able to be readily metered and mixed in the production of the PU products. The solvent capability for blowing agents, for example pentane, should likewise be very good.

Further objects were to improve the dimensional stability of the final PU products, or in any case not to make it worse, and also to improve the flame resistance of the end products, but at least not make it worse. Furthermore, the processability of the foam system in respect of the formation of surface defects should be improved.

This object has now surprisingly been able to be solved by replacing relatively high-functionality alcohols such as glycerol and/or TMP by alkoxylated relatively high-functionality alcohols such as alkoxylated glycerol and/or alkoxylated TMP.

The present invention accordingly provides a polyester polyol comprising the esterification product of a) from 10 to 70 mol % of a dicarboxylic acid composition comprising
   a1) an amount of from 50 to 100 mol %, based on the dicarboxylic acid composition a), of an aromatic dicarboxylic acid or a mixture of aromatic dicarboxylic acids,
   a2) an amount of from 0 to 50 mol %, based on the dicarboxylic acid composition a), of one or more aliphatic dicarboxylic acids,
b) from 2 to 30 mol % of one or more fatty acids and/or fatty acid derivatives,
c) from 10 to 70 mol % of one or more aliphatic or cycloaliphatic diols having from 2 to 18 carbon atoms or alkoxylates thereof,
d) from 2 to 50 mol % of a polyether alcohol having a functionality of greater than or equal to 2, preferably greater than 2, particularly preferably greater than or equal to 2.2, prepared by alkoxylation, preferably by ethoxylation, of a polyol e) having a functionality of greater than or equal to 2, where the mol % of components a) to d) add up to 100% and wherein at least 200 mmol, preferably at least 500 mmol and particularly preferably at least 800 mmol, of polyols d) are reacted per kg of polyester polyol.

In one embodiment of the present invention, the component a1) comprises at least one material from the group consisting of terephthalic acid, dimethyl terephthalate (DMT), polyethylene terephthalate (PET), phthalic acid, phthalic anhydride (PAn) and isophthalic acid.

In one embodiment of the present invention, the component a1) comprises at least one material from the group consisting of terephthalic acid, dimethyl terephthalate (DMT), polyethylene terephthalate (PET) and phthalic anhydride (PAn).

In one embodiment of the present invention, the component a2) is comprised in an amount of from 0 to 30 mol %, preferably from 0 to 10 mol %, particularly preferably 0 mol %, in the dicarboxylic acid composition a).

In one embodiment of the present invention, the component b) goes into the esterification product to an extent of from 3 to 20 mol %, particularly preferably from 5 to 18 mol %.

In one embodiment of the present invention, the component c) goes into the esterification product to an extent of from 20 to 60 mol %, preferably from 25 to 55 mol %, particularly preferably from 30 to 40 mol %.

In one embodiment of the present invention the component d) goes into the esterification product to an extent of from 2 to 40 mol %, preferably from 2 to 35 mol %, particularly preferably from 20 to 25 mol %.

In one embodiment of the present invention, the aliphatic or cycloaliphatic diol c) is selected from the group consisting of ethylene glycol, diethylene glycol and propylene glycol, 1,3-propanediol, 1,4-butanediol, 1,5-pentanediol, 1,6-hexanediol, 2-methyl-1,3-propanediol, 3-methyl-1,5-pentanediol and alkoxylates thereof.

In a preferred embodiment of the present invention, the aliphatic diol c) is diethylene glycol.

In one embodiment of the present invention, the fatty acid or the fatty acid derivative b) is selected from the group consisting of castor oil, polyhydroxy fatty acids, ricinoleic acid, hydroxyl-modified oils, grapeseed oil, black cumin oil, pumpkin kernel oil, borage seed oil, soybean oil, wheat germ oil, rapeseed oil, sunflower oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, hydroxyl-modified fatty acids and fatty acid esters based on myristoleic acid, palmitoleic acid, oleic acid, vaccenic acid, petroselic acid, gadoleic acid, erucic acid, nervonic acid, linoleic acid, α- and γ-linolenic acid, stearidonic acid, arachidonic acid, timnodonic acid, clupanodonic acid and cervonic acid.

In a preferred embodiment of the present invention, the fatty acid or the fatty acid derivative b) is oleic acid and/or soybean oil and/or rapeseed oil, particularly preferably oleic acid. The fatty acid or the fatty acid derivative generally serves to improve the blowing agent solubility, for example in a process for producing polyurethane foams.

In one embodiment of the present invention, the polyether alcohol d) is selected from the group consisting of reaction products of glycerol, trimethylolpropane (TMP), pentaerythritol and mixtures thereof with an alkylene oxide, and also propylene glycol (PEG).

In one embodiment of the present invention, the polyether alcohol d) is prepared by reacting a polyol e) having a functionality of greater than or equal to 2, preferably greater than 2, with ethylene oxide and/or propylene oxide, preferably with ethylene oxide.

In one embodiment of the present invention, the polyether alcohol d) comprises the reaction product of glycerol with ethylene oxide and/or propylene oxide, preferably with ethylene oxide.

In one embodiment of the present invention, the polyether alcohol d) comprises the reaction product of trimethylolpropane with ethylene oxide and/or propylene oxide, preferably with ethylene oxide.

In one embodiment of the present invention, the polyether alcohol d) has an OH number in the range from 1250 to 100 mg KOH/g, preferably from 950 to 150 mg KOH/g, particularly preferably from 800 to 240 mg KOH/g.

In a preferred embodiment of the present invention, the polyether alcohol d) comprises the reaction product of trimethylolpropane or glycerol, preferably trimethylpropane, with ethylene oxide, where the OH number of the polyether alcohol d) is in the range from 500 to 650 mg KOH/g.

In a particularly preferred embodiment of the present invention, the polyether alcohol d) comprises the reaction product of trimethylolpropane or glycerol, preferably trimethylpropane, with ethylene oxide, where the OH number of the polyether alcohol d) is in the range from 500 to 650 mg KOH/g, and the aliphatic or cycloaliphatic diol c) is diethylene glycol and the fatty acid or fatty acid derivative is oleic acid.

In one embodiment of the present invention, a polyether alcohol d) which has a functionality of greater than 2 and has been prepared by alkoxylation of a polyol e) having a functionality of greater than or equal to 3 is used.

In a preferred embodiment of the present invention, the polyesterol of the invention has an average functionality of greater than or equal to 2, preferably greater than 2, particularly preferably greater than 2.2.

To prepare the polyester polyols of the invention, the organic, e.g. aliphatic and preferably aromatic, polycarboxylic acids and/or derivatives and polyhydric alcohols are polycondensed in the absence of catalysts or preferably in the presence of esterification catalysts, advantageously in an atmosphere of inert gas, e.g. nitrogen, carbon monoxide, helium, argon, etc., in the melt at temperatures of from 150 to 280° C., preferably from 180 to 260° C., optionally under reduced pressure, to the desired acid number which is advantageously less than 10, preferably less than 2. In a preferred embodiment, the esterification mixture is polycondensed at the abovementioned temperatures to an acid number of from 80 to 20, preferably from 40 to 20, under atmospheric pressure and subsequently under a pressure of less than 500 mbar, preferably from 40 to 400 mbar. Possible esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as, benzene, toluene, xylene or chlorobenzene in order to distill off the water of condensation as an azeotrope.

To prepare the polyester polyols, the organic polycarboxylic acids and/or derivatives and polyhydric alcohols are advantageously polycondensed in a molar ratio of 1:1-2.2, preferably 1:1.05-2.1 and particularly preferably 1:1.1-2.0.

The polyester polyols obtained preferably have a functionality of from 1.8 to 4, in particular from 2 to 3, and a molecular weight of from 300 to 3000, preferably from 400 to 1000 and in particular from 450 to 800.

Furthermore, the invention also provides a process for producing rigid PU foams; for the purposes of the present invention, the term "PU" (polyurethan) also encompasses the chemically closely related "PIR" (polyisocyanurate) polymers.

In particular, the invention provides a process for producing rigid polyurethane foams by reacting
 A. organic and/or modified organic diisocyanates and/or polyisocyanates with
 B. the specific polyester polyols according to the invention,
 C. optionally further polyester polyols,
 D. optionally polyetherols and/or further compounds having at least two groups which are reactive toward isocyanates,
 E. and optionally chain extenders and/or crosslinkers,
 F. one or more blowing agents,
 G. catalysts and also
 H. optionally further auxiliaries and/or additives and
 I. optionally at least one flame retardant.

The present invention further provides rigid polyurethane foams and rigid polyisocyanurate foams which can be obtained by the process of the invention, and also the use of the polyester polyols of the invention for producing rigid polyurethane foams or rigid polyisocyanurate foams.

To produce the rigid polyurethane foams by the process of the invention, use is made of, in addition to the above-described specific polyester polyols, the formative components which are known per se, about which the following details may be provided.

Possible organic and/or modified organic polyisocyanates A) are the aliphatic, cycloaliphatic, araliphatic and preferably aromatic polyfunctional isocyanates known per se.

Specific examples are: alkylene diisocyanates having from 4 to 12 carbon atoms in the alkylene radical, e.g. dodecane 1,12-diisocyanate, 2-ethyltetramethylene 1,4-diisocyanate, 2-methylpentamethylene 1,5-diisocyanate, tetramethylene 1,4-diisocyanate, and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures and preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 2,4'-, 2,4'- and 2,2'-diisocyanates and polyphenylpolymethylene polyisocyanates (crude MDI) and mixtures of crude MDI and tolylene diisocyanates. The organic diisocyanates and polyisocyanates can be used individually or in the form of their mixtures.

Preferred diisocyanates and polyisocyanates are tolylene diisocyanate (TDI), diphenylmethane diisocyanate (MDI) and in particular mixtures of diphenylmethane diisocyanate and polyphenylenepolymethylene polyisocyanates (polymeric MDI or PMDI).

Use is frequently also made of modified polyfunctional isocyanates, i.e. products which are obtained by chemical reaction of organic diisocyanates and/or polyisocyanates. Examples which may be mentioned are diisocyanates and/or polyisocyanates comprising ester, urea, biuret, allophanate, carbodiimide, isocyanurate, uretdione, carbamate and/or urethane groups.

Very particular preference is given to using polymeric MDI for producing rigid polyurethane foams.

Suitable further polyester polyols C) can be prepared, for example, from organic dicarboxylic acids having from 2 to 12 carbon atoms, preferably aromatic or a mixture of aromatic and aliphatic dicarboxylic acids, and polyhydric alcohols, preferably diols, having from 2 to 12 carbon atoms, preferably from 2 to 6 carbon atoms. Possible dicarboxylic acids are, for example: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. It is also possible to use the corresponding dicarboxylic acid derivatives, e.g. dicarboxylic esters of alcohols having from 1 to 4 carbon atoms or dicarboxylic anhydrides, in place of the free dicarboxylic acids. As aromatic dicarboxylic acids, preference is given to using phthalic acid, phthalic anhydride, terephthalic acid and/or isophthalic acid as a mixture or alone. As aliphatic dicarboxylic acids, preference is given to using dicarboxylic acid mixtures of succinic, glutaric and adipic acid in weight ratios of, for example, 20-35: 35-50: 20-32 and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol, trimethylolpropane and pentaerythritol. Preference is given to using ethanediol, diethylene glycol, 1,4-butanediol, 1,5-pentanediol, 1,6-hexanediol or mixtures of at least two of the diols mentioned, in particular mixtures of 1,4-butanediol, 1,5-pentane-diol and 1,6-hexanediol. It is also possible to use polyester polyols derived from lactones, e.g. $\epsilon$-caprolactone, or hydroxycarboxylic acids, e.g. ($\omega$-hydroxycaproic acid.

To prepare the further polyester polyols C), bio-based starting materials and/or derivatives thereof are also suitable, for example, castor oil, polyhydroxy fatty acids, ricinoleic acid, hydroxyl-modified oils, grapeseed oil, black cumin oil, pumpkin kernel oil, borage seed oil, soybean oil, wheat germ oil, rapeseed oil, sunflower oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, hydroxyl-modified fatty acids and fatty acid esters based on myristoleic acid, palmitoleic acid, oleic acid, vaccenic acid, petroselic acid, gadoleic acid, erucic acid, nervonic acid, linoleic acid, $\alpha$- and $\gamma$-linolenic acid, stearidonic acid, arachidonic acid, timnodonic acid, clupanodonic acid and cervonic acid.

It is also possible to make concomitant use of polyether polyols D) which are prepared by known methods, for example from one or more alkylene oxides having from 2 to 4 carbon atoms in the alkylene radical by anionic polymerization using alkali metal hydroxides, e.g. sodium or potassium hydroxide, or alkali metal alkoxides, e.g. sodium methoxide, sodium or potassium ethoxide or potassium isopropoxide, as catalysts with addition of at least one starter molecule comprising from 2 to 8, preferably from 2 to 6, reactive hydrogen atoms, or by cationic polymerization using Lewis acids, e.g. antimony pentachloride, boron fluoride etherate, etc., or bleaching earth, as catalysts.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures. Preferred alkylene oxides are propylene oxide and ethylene oxide, with particular preference being given to ethylene oxide.

Possible starter molecules are, for example: water, organic dicarboxylic acids, such as succinic acid, adipic acid, phthalic acid and terephthalic acid, aliphatic and aromatic, optionally N-monoalkyl-, N,N-dialkyl- and N,N'-dialkyl-substituted diamines having from 1 to 4 carbon atoms in the alkyl radical, e.g. optionally monoalkyl- and dialkyl-substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexa-methylenediamine, phenylenediamines, 2,3-, 2,4- and 2,6-toluenediamine and 4,4'-, 2,4'- and 2,2'-diaminodiphenylmethane.

Further possible starter molecules are: alkanolamines such as ethanolamine, N-methylethanolamine and N-ethylethanolamine, dialkanolamines, such as diethanolamine, N-methyldiethanolamine and N-ethyldiethanolamine and trialkanolamines, such as triethanolamine, and ammonia. Preference is given to using dihydric or polyhydric alcohols such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

The polyether polyols, preferably polyoxypropylene polyols and/or polyoxyethylene polyols, have a functionality of preferably from 2 to 6 and in particular from 2 to 5 and molecular weights of from 150 to 3000, preferably from 200 to 2000 and in particular from 250 to 1000.

Further suitable polyether polyols are polymer-modified polyether polyols, preferably graft polyether polyols, in particular those based on styrene and/or acrylonitrile which are prepared by in-situ polymerization of acrylonitrile, styrene or preferably mixtures of styrene and acrylonitrile, e.g. in a weight ratio of from 90:10 to 10:90, preferably from 70:30 to 30:70, advantageously in the abovementioned polyether polyols using methods analogous to those described in the German patent texts 11 11 394, 12 22 669 (U.S. Pat. Nos. 3,304,273, 3,383,351, 3,523,093), 11 52 536 (GB 10 40 452) and 11 52 537 (GB 987,618), and also polyether polyol dispersions which comprise, for example, polyureas, polyhydrazides, polyurethanes comprising bound tert-amino groups and/or melamine as disperse phase, usually in an amount of from 1 to 50% by weight, preferably from 2 to 25% by weight, and are described, for example, in EP-B 011 752 (U.S. Pat. Nos. 4,304,708), No. 4,374,209 and DE-A,32 31 497.

Like the polyester polyols, the polyether polyols can be used individually or in the form of mixtures. They can also be mixed with the graft polyether polyols or polyester polyols and with the hydroxyl-comprising polyesteramides, polyacetals, polycarbonates and/or polyether polyamines.

Possible hydroxyl-comprising polyacetals are, for example, the compounds which can be prepared from glycols such as diethylene glycol, triethylene glycol, 4,4'-dihydroxyethoxydiphenyldimethylmethane, hexanediol and formaldehyde. Suitable polyacetals can also be prepared by polymerization of cyclic acetals.

Possible hydroxyl-comprising polycarbonates are those of the type known per se which can be prepared, for example, by reacting diols such as 1,3-propanediol, 1,4-butanediol and/or 1,6-hexanediol, diethylene glycol, triethylene glycol or tetraethylene glycol with diaryl carbonates, e.g. diphenyl carbonate, alkylene carbonate or phosgene.

The polyesteramides include, for example, the predominantly linear condensates obtained from polybasic, saturated and/or unsaturated carboxylic acids or anhydrides thereof and polyhydric saturated and/or unsaturated amino alcohols or mixtures of polyhydric alcohols and amino alcohols and/or polyamines.

Suitable polyether polyamines can be prepared from the abovementioned polyether polyols by known methods. Mention may be made by way of example of the cyanoalkylation of polyoxyalkylene polyols and subsequent hydrogenation of the nitrile formed (U.S. Pat. No. 3,267,050) or the partial or complete amination of polyoxyalkylene polyols with amines or ammonia in the presence of hydrogen and catalysts (DE 12 15 373).

The rigid polyurethane foams according to the invention can be produced using chain extenders and/or crosslinkers (E). However, the addition of chain extenders, crosslinkers or, optionally, mixtures thereof can prove to be advantageous for modifying the mechanical properties, e.g. the hardness. As chain extenders and/or crosslinkers, use is made of diols and/or triols having molecular weights of less than 400, preferably from 60 to 300. Possibilities are, for example, aliphatic, cycloaliphatic and/or araliphatic diols having from 2 to 14, preferably from 4 to 10 carbon atoms, e.g. ethylene glycol, 1,3-propanediol, 1,10-decanediol, o-, m-, p-dihydroxycyclohexane, diethylene glycol, dipropylene glycol and preferably 1,4-butanediol, 1,6-hexanediol and bis(2-hydroxy-ethyl)hydroquinone, triols such as 1,2,4-, 1,3,5-trihydroxycyclohexane, glycerol and trimethylolpropane and low molecular weight hydroxyl-comprising polyalkylene oxides based on ethylene oxide and/or 1,2-propylene oxide and the abovementioned diols and/or triols as starter molecules.

Possible further compounds (D) having at least two groups which are reactive toward isocyanate, i.e. having at least two hydrogen atoms which are reactive toward isocyanate groups, are in particular those which have two or more reactive groups selected from among OH groups, SH groups, NH groups, $NH_2$ groups and CH-acid groups, e.g. β-diketo groups.

If chain extenders, crosslinkers or mixtures thereof are employed for producing the rigid polyurethane foams, they are advantageously used in an amount of from 0 to 20% by weight, preferably from 0.5 to 5% by weight, based on the weight of the component B).

Blowing agents (F) which are used for producing the rigid polyurethane foams include preferably water, formic acid and mixtures thereof. These react with isocyanate groups to form carbon dioxide and in the case of formic acid carbon dioxide and carbon monoxide. In addition, physical blowing agents such as low-boiling hydrocarbons can be used. Suitable physical blowing agents are liquids which are inert towards the organic, optionally modified polyisocyanates and have boiling points below 100° C., preferably below 50° C., at atmospheric pressure, so that they vaporize under the conditions of the exothermic polyaddition reaction. Examples of such liquids which can preferably be used are alkanes such as heptane, hexane, n-pentane and isopentane, preferably industrial mixtures of n-pentane and isopentane, n-butane and isobutane and propane, cycloalkanes such as cyclopentane and/or cyclohexane, ethers such as furan, dimethyl ether and diethyl ether, ketones such as acetone and methyl ethyl ketone, alkyl carboxylates such as methyl formate, dimethyl oxalate and ethyl acetate and halogenated hydrocarbons such as methylene chloride, dichloromono-fluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. Mixtures of these low-boiling liquids with one another and/or with other substituted or unsubstituted hydrocarbons can also be used. Organic carboxylic acids such as formic acid, acetic acid, oxalic acid, ricinoleic acid and carboxyl-comprising compounds are also suitable.

Preference is given to using water, formic acid, chlorodifluoromethane, chlorodifluoroethanes, dichlorofluoroethanes, all pentane isomers and mixtures thereof, cyclohexane and mixtures of at least two of these blowing agents, e.g. mixtures of water and cyclohexane, mixtures of chlorodifluoromethane and 1-chloro-2,2-difluoroethane and optionally water.

The blowing agents are either completely or partly dissolved in the polyol component (i.e. B+C+E+F+G+H+I) or are introduced via a static mixer immediately before foaming of the polyol component. It is usual for water or formic acid to be fully or partially dissolved in the polyol component and the physical blowing agent (for example pentane) and optionally the remainder of the chemical blowing agent to be introduced "on-line".

Pentane, possibly parts of the chemical blowing agent, part or all of the catalysts are introduced in situ into the polyol component, but the latter usually already comprises parts thereof (with the exception of pentane). The auxiliaries and additives and also the flame retardants are, if present, already present in the polyol blend.

The amount of blowing agent or blowing agent mixture used is from 1 to 45% by weight, preferably from 1 to 30% by weight, particularly preferably from 1.5 to 20% by weight, in each case based on the sum of the components B) to G).

If water serves as blowing agent, it is preferably added to the formative component B) in an amount of from 0.2 to 5% by weight, based on the formative component B). The addition of water can be combined with the use of the other blowing agents described.

Catalysts (G) used for producing the rigid polyurethane foams are, in particular, compounds which strongly accelerate the reaction of the compounds comprising reactive hydrogen atoms, in particular hydroxyl groups, of component B) and optionally C) with the organic, optionally modified polyisocyanates A).

It is advantageous to use basic polyurethane catalysts, for example tertiary amines such as triethylamine, tributylamine, dimethylbenzylamine, dicyclohexylmethylamine, dimethylcyclohexylamine, bis(N,N-dimethylaminoethyl)ether, bis(dimethylamino-propyl)urea, N-methylmorpholine or N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazole, 1-azabicyclo-[2.2.0]octane, 1,4-diazabicyclo[2.2.2]octane (Dabco) and alkanolamine compounds, such as triethanolamine, triisopropanolamine, N-methyldiethanolamine and N-ethyl-diethanolamine, dimethylaminoethanol, 2-(N, N-dimethylaminoethoxy)ethanol, N,N',N"-tris(dialkylaminoalkyl)hexahydrotriazines, e.g. N,N',N"-tris(dimethylamino-propyl)-s-hexahydrotriazine, and triethylenediamine. However, metal salts such as iron(II) chloride, zinc chloride, lead octoate and preferably tin salts such as tin dioctoate, tin diethylhexoate and dibutyltin dilaurate and also, in particular, mixtures of tertiary amines and organic tin salts are also suitable.

Further possible catalysts are: amidines such as 2,3-dimethyl-3,4,5,6-tetra-hydropyrimidine, tetraalkylammonium hydroxides such as tetramethylammonium hydroxide, alkali metal hydroxides such as sodium hydroxide and alkali metal alkoxides such as sodium methoxide and potassium isopropoxide and also alkali metal salts of long-chain fatty acids having from 10 to 20 carbon atoms and optionally lateral OH groups. Preference is given to using from 0.001 to 5% by weight, in particular from 0.05 to 2% by weight, of catalyst or catalyst combination, based on the weight of the component B). It is also possible to allow the reactions to proceed without catalysis. In this case, the catalytic activity of amine-initiated polyols is exploited.

If, during foaming, a relatively large polyisocyanate excess is used, further suitable catalysts for the trimerization reaction of the excess NCO groups with one another are: catalysts which form isocyanurate groups, for example ammonium salts or alkali metal salts either alone or in combination with tertiary amines. Isocyanurate formation leads to flame-resistant PIR foams which are preferably used in industrial rigid foam, for example in building and construction as insulation boards or sandwich elements.

Further information regarding the abovementioned and further starting materials may be found in the technical literature, for example Kunststoffhandbuch, Volume VII, Polyurethane, Carl Hanser Verlag Munich, Vienna, 1st, 2nd and 3rd Editions 1966, 1983 and 1993.

Further auxiliaries and/or additives (H) can optionally be added to the reaction mixture for producing the rigid polyurethane foams. Mention may be made of, for example, surface-active substances, foam stabilizers, cell regulators, fillers, dyes, pigments, flame retardants, hydrolysis inhibitors, fungistatic and bacteriostatic substances.

Possible surface-active substances are, for example, compounds which serve to aid homogenization of the starting materials and may also be suitable for regulating the cell structure of the polymers. Mention may be made of, for example, emulsifiers such as the sodium salts of castor oil sulfates or of fatty acids and also salts of fatty acids with amines, e.g. diethylamine oleate, diethanolamine stearate, diethanolamine ricinoleate, salts of sulfonic acids, e.g. alkali metal or ammonium salts of dodecylbenzenesulfonic or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators such as paraffins, fatty alcohols and dimethylpolysiloxanes. The above-described oligomeric acrylates having polyoxyalkylene and fluoroalkane radicals as side groups are also suitable for improving the emulsifying action, the cell structure and/or for stabilizing the foam. The surface-active substances are usually employed in amounts of from 0.01 to 10% by weight, based on 100% by weight of the component B).

For the purposes of the present invention, fillers, in particular reinforcing fillers, are the customary organic and inorganic fillers, reinforcing materials, weighting agents, agents for improving the abrasion behavior in paints, coating compositions, etc., which are known per se. Specific examples are: inorganic fillers such as siliceous minerals, for example sheet silicates such as antigorite, serpentine, hornblendes, amphiboles, chrisotile and talc, metal oxides such as kaolin, aluminum oxides, titanium oxides and iron oxides, metal salts, such as chalk, barite and inorganic pigments such as cadmium sulfide and zinc sulfide and also glass, etc. Preference is given to using kaolin (china clay), aluminum silicate and coprecipitates of barium sulfate and aluminum silicate and also natural and synthetic fibrous minerals such as wollastonite, metal fibers and in particular glass fibers of various length, which may optionally be coated with a size. Possible organic fillers are, for example: carbon, melamine, rosin, cyclopentadienyl resins and graft polymers and also cellulose fibers, polyamide, polyacrylonitrile, polyurethane, polyester fibers based on aromatic and/or aliphatic dicarboxylic esters and in particular carbon fibers.

The inorganic and organic fillers can be used individually or as mixtures and are advantageously added to the reaction mixture in amounts of from 0.5 to 50% by weight, preferably from 1 to 40% by weight, based on the weight of the components A) to C), although the content of mats, nonwovens and woven fabrics of natural and synthetic fibers can reach values of up to 80% by weight.

As flame retardants (I), it is generally possible to use the flame retardants known from the prior art. Suitable flame retardants are, for example, unincorporatable brominated substances, brominated esters, brominated ethers (Ixol) or brominated alcohols such as dibromoneopentyl alcohol, tribromoneopentyl alcohol and PHT-4-diol and also chlorinated phosphates such as tris(2-chloroethyl)phosphate, tris(2-chloropropyl)phosphate, tris(1,3-dichloropropyl)phosphate, tricresyl phosphate, tris(2,3-dibromo-propyl)phosphate, tetrakis(2-chloroethyl)ethylenediphosphate, dimethyl methanephosphonate, diethyl diethanolaminomethylphosphonate and also commercial halogen-comprising flame retardant polyols. As further liquid flame retardants, it is possible to use phosphates or phosphonates, e.g. diethyl ethanephosphonate (DEEP), triethylphosphate (TEP), dimethyl propylphosphonate (DMPP), diphenyl cresyl phosphate (DPK) and others.

Apart from the abovementioned flame retardants, it is possible to use inorganic or organic flame retardants such as red phosphorus, preparations comprising red phosphorus, aluminum oxide hydrate, antimony trioxide, arsenic oxide, ammonium polyphosphate and calcium sulfate, expandable graphite or cyanuric acid derivatives such as melamine, or mixtures of at least two flame retardants, e.g. ammonium polyphosphates and melamine and optionally maize starch or ammonium polyphosphate, melamine and expandable graphite and/or optionally aromatic polyesters for making the rigid polyurethane foams flame resistant.

In general, it has been found to be advantageous to use from 1 to 70% by weight, preferably from 5 to 50% by weight, particularly preferably from 10 to 30% by weight, of the flame retardants mentioned, based on the polyol system (i.e. components B+C+D+E+F+G+H+I).

Further information regarding the abovementioned other customary auxiliaries and additives may be found in the technical literature, for example the monograph by J. H. Saunders and K. C. Frisch "High Polymers" Volume XVI, Polyurethanes, Parts 1 and 2, Interscience Publishers 1962 and 1964, or Kunststoff-Handbuch, Polyurethane, Volume VII, Hanser-Verlag, Munich, Vienna, 1st and 2nd Editions, 1966 and 1983.

To produce the rigid polyurethane foams of the invention, the organic and/or modified organic polyisocyanates A), the specific polyester polyols B) and optionally polyetherols and/or further compounds (D) having at least two groups which are reactive toward isocyanates and optionally chain extenders and/or crosslinkers (E) are reacted in such amounts that the equivalence ratio of NCO groups of the polyisocyanates A) to the sum of the reactive hydrogen atoms of the components B) and optionally C) and D) to G) is 1-6:1, preferably 1.1-5:1 and in particular 1.2-3.5:1.

The rigid polyurethane foams are advantageously produced by the one-shot process, for example by means of the high-pressure or low-pressure technique, in open or closed molds, for example metallic molds. Continuous application of the reaction mixture to suitable conveyor belts for producing panels is also customary.

The starting components are mixed at a temperature of from 15 to 90° C., preferably from 20 to 60° C. and in particular from 20 to 35° C., and introduced into the open mold or, optionally under elevated pressure, into the closed mold or, in the case of a continuous workstation, applied to a belt which accommodates the reaction mixture. Mixing can, as indicated above, be carried out mechanically by means of a stirrer or a stirring screw. The mold temperature is advantageously from 20 to 110° C., preferably from 30 to 70° C. and in particular from 40 to 60° C.

The rigid polyurethane foams produced by the process of the invention have a density of from 15 to 300 g/l, preferably from 20 to 100 g/l and in particular from 25 to 60 g/l.

EXAMPLES

The present invention is illustrated by the following examples, with the examples only serving to illustrate certain aspects of the invention and in no way being intended as a limitation of the scope of the invention.

Various polyesterols were prepared:
General Method

The dicarboxylic acid, the fatty acid of the fat derivative, the aliphatic or cycloaliphatic diol or alkoxylates thereof and the higher-functional polyol were introduced into a 4 liter round-bottom flask equipped with a mechanical stirrer, a thermometer and a distillation column and also a nitrogen inlet tube. After addition of 300 ppm of titanium tetrabutylate as catalyst, the mixture is stirred and heated to 240° C., with the water liberated being distilled off continuously. The reaction is carried out at 400 mbar. This gives a polyesterol having an acid number of ≤1 mg KOH/g.

Comparative Example 1

1100.0 g of terephthalic acid, 374.5 g of oleic acid, 950.0 g of diethylene glycol and 367.7 g of trimethylolpropane are reacted using the general method. This gives a polyesterol having an OH functionality of 2.3 and a hydroxyl number of 243 mg KOH/g.

Comparative Example 2

1183.0 g of terephthalic acid, 402.3 g of oleic acid, 869.1 g of diethylene glycol and 327.9 g of glycerol are reacted using the general method. This gives a polyesterol having an OH functionality of 2.5 and a hydroxyl number of 252 mg KOH/g.

Comparative Example 3

980.0 g of phthalic anhydride, 746.7 g of oleic acid, 912.2 g of diethylene glycol and 532.2 g of trimethylolpropane are reacted using the general method. This gives a polyesterol having an OH functionality of 2.2 and a hydroxyl number of 244 mg KOH/g.

Example 1 According to the Invention 822.0 g of terephthalic acid, 384.4 g of oleic acid, 748.2 g of diethylene glycol and 748.3 g of the polyether alcohol A based on trimethylolpropane and ethylene oxide and having an OH functionality of 3 and a hydroxyl number of 610 mg KOH/g were reacted according to the general method. This gave a polyesterol having an OH functionality of 2.3 and a hydroxyl number of 254 mg KOH/g.

Example 2 According to the Invention 681.4 g of terephthalic acid, 376.6 g of oleic acid, 533.2 g of diethylene glycol and 1080.7 g of the polyether alcohol B based on glycerol and ethylene oxide and having an OH functionality of 3 and a hydroxyl number of 535 mg KOH/g were reacted according to the general method. This gave a polyesterol having an OH functionality of 2.5 and a hydroxyl number of 242 mg KOH/g.

Example 3 According to the Invention 980.0 g of phthalic anhydride, 1120.1 g of oleic acid, 1017.5 g of diethylene glycol and 1638.5 g of the polyether alcohol A based on trimethylolpropane and ethylene oxide and having an OH functionality of 3 and a hydroxyl number of 610 mg KOH/g were reacted according to the general method. This gave a polyesterol having an OH functionality of 2.2 and a hydroxyl number of 247 mg KOH/g.

Example 4 According to the Invention 980.0 g of phthalic anhydride, 933.4 g of oleic acid, 1245.6 g of diethylene glycol and 2447.7 g of the polyether alcohol C based on trimethylolpropane and propylene oxide and having an OH functionality of 3 and a hydroxyl number of 400 mg KOH/g were reacted according to the general method. This gave a polyesterol having an OH functionality of 2.2 and a hydroxyl number of 238 mg KOH/g.

TABLE 1

| | OH Functionality | Hydroxyl number (mg KOH/g) | Trifunctional alcohol | Viscosity$^{25°\ C.}$ (mPa·s) |
|---|---|---|---|---|
| Comparative Example 1 | 2.3 | 243 | trimethylol-propane | 21100 |
| Comparative Example 2 | 2.5 | 252 | glycerol | 36800 |
| Comparative Example 3 | 2.2 | 244 | trimethylol-propane | 8500 |
| Example 1 according to the invention | 2.3 | 254 | polyether alcohol A | 3200 |
| Example 2 according to the invention | 2.5 | 242 | polyether alcohol B | 2300 |
| Example 3 according to the invention | 2.2 | 247 | polyether alcohol A | 1100 |
| Example 4 according to the invention | 2.2 | 238 | polyether alcohol C | 900 |

Table 1 shows that the polyesterols prepared by the process of the invention have lower viscosity.

Measurement Methods

The frequency of surface defects is determined by an optical method. In this method, a plane is defined in a foam specimen at a distance of one millimeter from the lower covering layer, i.e. the covering layer on which the polyurethane reaction solution was applied in the double belt process and material above this is removed. The foam surface obtained in this way is illuminated at an opening angle of 5° and the area of the shadow thrown by surface defects is divided by the total surface area. The ratio of the shadow area to the total surface area is preferably less than 5%, preferably less than 2.5% and particularly preferably less than 2%.

Surface Defects

The surface defects were determined using the above-described method. For this purpose, the illuminated foam surface was photographed. The foam images were subsequently binarized and superposed. The integrated area of the black regions of the binary images is divided by the total area of the images and is thus a measure of the frequency of surface defects.

Furthermore, an additional quantitative assessment of the nature of the surface of the rigid PUR foams was undertaken by removing the covering layer from a 1 m×2 m foam specimen and optically assessing the surfaces.

Determination of the Processability:

The processability is determined by examining foam formation during processing. Large blowing agent bubbles which burst at the foam surface and thus tear open the surface are referred to as "blow-outs" and the system cannot be processed in a problem-free manner. If this unsatisfactory behavior is not observed, processing is problem-free.

Thickness

To determine the element thickness after foaming, a sandwich element having a 50 µm thick aluminum foil as covering layer material is produced by the double belt process and the element thickness is determined in the middle of the element 5 minutes after production.

Fume Toxicity

To evaluate the fume toxicity, the content of trimethylolpropane phosphate (TMPP) in the fumes from a slow combustion was determined.

The slow combustion of the rigid foam specimens was carried out in a ring oven in accordance with DIN 53436 part 1. The experimental conditions were 300° C. ring oven temperature, 1 cm/min advance, 120 l/h air throughput and 1 g specimen weight.

The gases from the slow combustion were passed into two cooled wash bottles which were connected in series and were filled with acetone or acetone/methoxyethanol. The amount of TMPP in the combined solution was determined quantitatively by means of HRGC-MS (internal calibration with pure TMPP).

Production of Rigid Polyurethane Foams (Variant 1):

The isocyanates and the components which are reactive toward isocyanate were foamed together with the blowing agents, catalysts and all further additives at a constant mixing ratio of polyol to isocyanate of 100:190.

Polyol Component:

47.5 parts by weight of polyesterol as per examples or comparative examples
15 parts by weight of polyetherol having an OH number of ~490 mg KOH/g and prepared by polyaddition of propylene oxide onto a sucrose/glycerol mixture as starter molecule
10 parts by weight of polyetherol comprising the ether of ethylene glycol and ethylene oxide and having a hydroxyl functionality of 2 and a hydroxyl number of 200 mg KOH/g
25 parts by weight of flame retardant trichloroisopropyl phosphate (TCPP)
2.5 parts by weight of stabilizer Niax Silicone L 6635 (silicone-containing stabilizer)
6.5 parts by weight of pentane S 80:20
about 2.3 parts by weight of water
1.5 parts by weight of potassium acetate (47% strength by weight in ethylene glycol)
about 1.1 parts by weight of dimethylcyclohexylamine Isocyanate Component:

190 parts by weight of Lupranat® M50 (polymeric methylenedi(phenyl diisocyanate) (PMDI) having a viscosity of about 500 mPa*s at 25° C.)

50 mm thick sandwich elements were produced by the double belt process. The foam density was set to 38+/−1 g/l at a constant pentane content of 6.5 parts by varying the water content. The fiber time was also set to 25+/−1 s by varying the proportion of dimethylcyclohexylamine.

The results are summarized in Table 2 and Table 3

TABLE 2

Results of the experiments on production of 50 mm thick sandwich elements by the double belt process

| Polyester polyol: | Comparative Example 1 | Example 1 according to the invention |
|---|---|---|
| Bottom flaws [%]/visual assessment | 9.5/poor | 1.2%/good |
| Processing | slight blow-outs | problem-free |

TABLE 3

Results of the experiments on production of 50 mm
thick sandwich elements by the double belt process

| Polyester polyol: | Comparative Example 2 | Example 2 according to the invention |
|---|---|---|
| Bottom flaws [%]/visual assessment | 10.2/poor | 2.1%/good |
| Processing | blow-outs | problem-free |

Tables 2 and 3 show that the rigid polyurethane foams produced by the process of the invention can be produced more easily in a problem-free manner.

Furthermore, 170 mm thick sandwich elements were produced by the double belt process using the systems comprising Comparative Example 2 and Example 2 according to the invention. The foam density was set to 38+/−1 g/l at a constant pentane content of 6.5 parts by varying the water content. The fiber time was also set to 40+/−1 s by varying the proportion of dimethylcyclohexylamine.

The results are summarized in Table 4:

TABLE 4

Results of the experiments on production of 170 mm
thick sandwich elements by the double belt process

| Polyester polyol: | Comparative Example 2 | Example 2 according to the invention |
|---|---|---|
| Element thickness after foaming | 187 mm | 177 mm |

Table 4 shows that the dimensional stability of the polyurethane system is significantly improved by the use of the polyesterol according to the invention.

Production of Rigid Polyurethane Foams (Variant 2):

Furthermore, test plates were produced by the double belt process according to the following production of a rigid polyurethane foam (Variant 2).

The isocyanates and the components which are reactive toward isocyanate were foamed together with the blowing agents, catalysts and all further additives at a constant mixing ratio of polyol component to isocyanate component of 100:170.

Polyol Component:

- 58 parts by weight of polyesterol as per Examples or Comparative Examples
- 10 parts by weight of polyetherol comprising the ether of ethylene glycol and ethylene oxide having a hydroxyl functionality of 2 and a hydroxyl number of 200 mg KOH/g
- 30 parts by weight of flame retardant trischloroisopropyl phosphate (TCPP)
- 2 parts by weight of stabilizer Tegostab B 8443 (silicone-comprising stabilizer)
- 10 parts by weight of n-pentane
- 1.6 parts by weight of formic acid (85%)
- 2.0 parts by weight of potassium formate (36% strength by weight in ethylene glycol)
- 0.6 part by weight of bis(2-dimethylaminoethyl) ether (70% by weight in dipropylene glycol)

Isocyanate Component:

170 parts by weight of Lupranat® M50

50 mm thick sandwich elements were produced by the double belt process. The foam density was set to 40+/−1 g/l at a constant formic acid content by varying the pentane content. The fiber time was also set to 25+/−1 s by varying the proportion of bis(2-dimethylaminoethyl)ether (70% by weight in dipropylene glycol).

The components A and B were, as indicated, foamed together. The results of the surface assessment and the processability are summarized in Tables 5 and 6.

TABLE 5

Results of the experiments on production of 50 mm
thick sandwich elements by the double belt process

| Polyester polyol: | Comparative Example 1 | Example 1 according to the invention |
|---|---|---|
| Bottom flaws [%]/visual assessment | 5.6/poor | 1.8%/good |

TABLE 6

Results of the experiments on production of 50 mm
thick sandwich elements by the double belt process

| Polyester polyol: | Comparative Example 2 | Example 2 according to the invention |
|---|---|---|
| Bottom flaws [%]/visual assessment | 6.1/poor | 1.6%/good |

Tables 5 and 6 show that the rigid polyisocyanurate foams produced by the process of the invention can be produced more easily in a problem-free manner.

Furthermore, 170 mm thick sandwich elements were produced by the double belt process using the systems comprising Comparative Example 2 and Example 2 according to the invention. The foam density was set to 40+/−1 g/l at a constant formic acid content by varying the pentane content. The fiber time was also set to 40+/−1 s by varying the proportion of bis(2-dimethylaminoethyl)ether (70% by weight in dipropylene glycol).

The results are summarized in Table 7:

TABLE 7

Results of the experiments on production of 170 mm
thick sandwich elements by the double belt process

| Polyester polyol: | Comparative Example 2 | Example 2 according to the invention |
|---|---|---|
| Element thickness after foaming | 188 mm | 176 mm |

Table 7 shows that the dimensional stability of the polyurethane system can be significantly improved by the use of the polyesterol according to the invention.

Production of Rigid Polyurethane Foams (Variant 3):

The isocyanates and the components which are reactive toward isocyanates were foamed together with the blowing agents, catalysts and all further additives at a constant mixing ratio of polyol to isocyanate of 100:190.

Polyol Component:

- 48 parts by weight of polyesterol comprising the esterification product of phthalic anhydride, diethylene glycol and oleic acid and having a hydroxyl functionality of 1.8 and hydroxyl number of 200 mg KOH/g of polyol.

-continued

| | |
|---|---|
| 15 parts by weight of | polyesterol as per examples or comparative examples |
| 10 parts by weight of | polyetherol comprising the ether of ethylene glycol and ethylene oxide and having a hydroxyl functionality of 2 and a hydroxyl number of 200 mg KOH/g of polyol. |
| 25 parts by weight of | flame retardant trischloroisopropyl phosphate (TCPP) |
| 2 parts by weight of | stabilizer based on a polysiloxane |
| 9 parts by weight of | n-pentane |
| about 1.5 parts by weight of | formic acid, 85% strength |
| 2 parts by weight of | potassium formate (36% by weight in ethylene glycol) |
| about 1.5 parts by weight of | bis-(2-dimethylaminoethyl) ether (70% by weight in dipropylene glycol) |

Isocyanate Component:
190 parts by weight of Lupranat® M50

The components were intensively mixed and the reaction mix was poured into an open mold in which the reaction mixture foamed then cured. In each case, a constant fiber time of 45 s was set by varying the amount of amine used. The overall foam density was set to a constant 45 g/l by varying the amount of formic acid used.

The results are summarized in Table 8.

TABLE 8

Results of the experiments on production of free-foamed rigid foam blocks

| Polyester polyol: | Comparative Example 3 | Example 3 according to the invention | Example 4 according to the invention |
|---|---|---|---|
| Processing quality | good | good | good |
| B2 burning test in accordance with DIN 4102, flame height in cm | 7.5 | 7.0 | 8.0 |
| Mass burnt in the slow combustion experiment | 0.26 g | 0.25 g | 0.26 g |
| TMPP content per sample mass burnt | 4423 μg/g | <100 μg/g | 308 μg/g |

The processing quality takes into account the different times which describe the course of the reaction, e.g. cream time, rise time and tact-free time, also the maximum reaction temperature, the course of foam rise, the curing behavior and the foam surface quality.

Table 8 shows that the examples according to the invention display, with equally good processing and burning behavior as the comparative example, a significantly reduced release of toxic TMPP under slow combustion conditions; this applies particularly to polyesterols according to the invention comprising esterified polyetherols based on ethylene oxide.

The invention claimed is:

1. A rigid polyurethane foam or rigid polyisocyanurate foam, obtained by a process comprising reacting:
   an organic diisocyanate, a modified organic diisocyanate, an organic polyisocyanate, a modified organic polyisocyanate, or any combination thereof;
   a polyester polyol;
   optionally further polyester polyols;
   optionally polyetherols, further compounds comprising two groups which are reactive toward an isocyanate, or any combination thereof;
   optionally chain extenders, crosslinkers, or any combination thereof;
   a blowing agent;
   a catalyst;
   optionally further auxiliaries, additives, or any combination thereof; and
   optionally a flame retardant,
   wherein the polyester polyol comprises an esterification product of
   (a.) from 10 to 70 mol % of a dicarboxylic acid composition comprising from 50 to 100 mol %, based on the dicarboxylic acid composition of an aromatic dicarboxylic acid or a mixture of aromatic dicarboxylic acids, and an amount of from 0 to 50 mol %, based on the dicarboxylic acid composition of at least one aliphatic dicarboxylic acid,
   (b.) from 2 to 30 mol % of a fatty acid, a fatty acid derivative, or any combination thereof,
   (c.) from 10 to 70 mol % of an aliphatic or cycloaliphatic diol having from 2 to 18 carbon atoms, an alkoxylate thereof, or any combination thereof,
   (d.) from 2 to 50 mol % of a polyether alcohol, amounting to at least 200 mmol per kg of polyester polyol, having a functionality of greater than or equal to 2 and obtained by a process comprising ethoxylation of a polyol having a functionality of greater than or equal to 3,
   wherein mol % of components (a) to (d) add up to 100%,
   wherein, if TMPP is present in fumes from a slow combustion of the foam, a TMPP content in fumes from a slow combustion of the foam is below 308 μg per g, and
   wherein component (d) the polyether alcohol has an OH number of from 1250 to 240 mg KOH/g.

2. The rigid polyurethane foam or rigid polyisocyanurate foam according to claim 1, wherein the dicarboxylic acid composition comprises at least one material selected from the group consisting of terephthalic acid, dimethyl terephthalate (DMT), polyethylene terephthalate (PET), phthalic acid, phthalic anhydride (PSA), and isophthalic acid.

3. The rigid polyurethane foam or rigid polyisocyanurate foam according to claim 1, wherein the amount of the at least one aliphatic dicarboxylic acid in the dicarboxylic acid composition (a) is from 0 to 30 mol %.

4. The rigid polyurethane foam or rigid polyisocyanurate foam according to claim 1, wherein the esterification product is an esterification product of from 3 to 20 mol % of the component (b).

5. The rigid polyurethane foam or rigid polyisocyanurate foam according to claim 1, wherein the esterification product is an esterification product of from 20 to 60 mol % of the component (c).

6. The rigid polyurethane foam or rigid polyisocyanurate foam according to claim 1, wherein the esterification product is an esterification product of from 2 to 40 mol % of the component (d).

7. The rigid polyurethane foam or rigid polyisocyanurate foam according to claim 1, wherein the component (c) is at least one selected from the group consisting of ethylene glycol, diethylene glycol, propylene glycol, 1,3-propanediol, 1,4-butanediol, 1,5 pentanediol, 1,6 hexanediol, 2-methyl-1,3-propanediol, 3-methyl-1,5-pentanediol, and an alkoxylate thereof.

8. The rigid polyurethane foam or rigid polyisocyanurate foam according to claim 1, wherein the component(b) is at least one selected from the group consisting of castor oil, a polyhydroxy fatty acid, ricinoleic acid, a hydroxyl-modified oil, grapeseed oil, black cumin oil, pumpkin kernel oil, borage seed oil, soybean oil, wheat germ oil, rapeseed oil, sunflower oil, peanut oil, apricot kernel oil, pistachio oil, almond oil, olive oil, macadamia nut oil, avocado oil, sea buckthorn oil, sesame oil, hemp oil, hazelnut oil, primula oil, wild rose oil, safflower oil, walnut oil, a hydroxyl-modified fatty acid based on myristoleic acid, a hydroxyl-modified fatty acid ester based on myristoleic acid, palmitoleic acid, oleic acid, vaccenic acid, petroselic acid, gadoleic acid, erucic acid, nervonic acid, linoleic acid, α-linolenic acid, β-linolenic acid, stearidonic acid, arachidonic acid, timnodonic acid, clupanodonic acid, and cervonic acid.

9. The rigid polyurethane foam or rigid polyisocyanurate foam according to claim 1, wherein the polyether alcohol (d) is a reaction product of glycerol, trimethylolpropane (TMP), pentaerythritol or a mixture thereof with ethylene oxide.

10. The rigid polyurethane foam or rigid polyisocyanurate foam according to claim 1, wherein the polyether alcohol (d) comprises a reaction product of glycerol with ethylene oxide.

11. The rigid polyurethane foam or rigid polyisocyanurate foam according to claim 1, wherein the polyether alcohol (d) comprises a reaction product of trimethylolpropane with ethylene oxide.

12. The rigid polyurethane foam or rigid polyisocyanurate foam according to claim 1,
wherein the polyether alcohol (d) comprises a reaction product of trimethylolpropane with ethylene oxide and an OH number of the polyether alcohol (d) is from 500 to 650 mg KOH/g.

13. The rigid polyurethane foam or rigid polyisocyanurate foam according to claim 1, wherein the polyester polyol has an average functionality of greater than or equal to 2.

14. A process of producing the rigid polyurethane foam or rigid polyisocyanurate foam of claim 1, the process comprising reacting
the organic diisocyanate, modified organic diisocyanate, organic polyisocyanate, modified organic polyisocyanate, or combination thereof,
the polyester polyol,
optionally further polyester polyols,
optionally polyetherols, further compounds comprising two groups which are reactive toward an isocyanate, or any combination thereof,
optionally chain extenders, crosslinkers, or any combination thereof
the blowing agent,
the catalyst,
optionally further auxiliaries, additives, or any combination thereof, and optionally a flame retardant.

15. The rigid polyurethane foam or rigid polyisocyanurate foam of claim 1, wherein the TMPP content, if present, in fumes from a slow combustion of the foam is below 100 µg per g.

16. The rigid polyurethane foam or rigid polyisocyanurate foam of claim 1, wherein the esterification product is obtained by a process comprising reacting at least 500 mmol of polyether alcohol (d) per kg of the polyester polyol.

17. The rigid polyurethane foam or rigid polyisocyanurate foam of claim 1, wherein the esterification product is obtained by a process comprising reacting at least 800 mmol of polyether alcohol (d) per kg of the polyester polyol.

18. The rigid polyurethane foam or rigid polyisocyanurate foam of claim 1, wherein component (d) the polyether alcohol has an OH number of from 950 to 500 mg KOH/g.

19. The rigid polyurethane foam or rigid polyisocyanurate foam of claim 1, wherein component (d) the polyether alcohol is ethoxylated glycerol, ethoxylated TMP, or any combination thereof.

* * * * *